Patented July 19, 1938

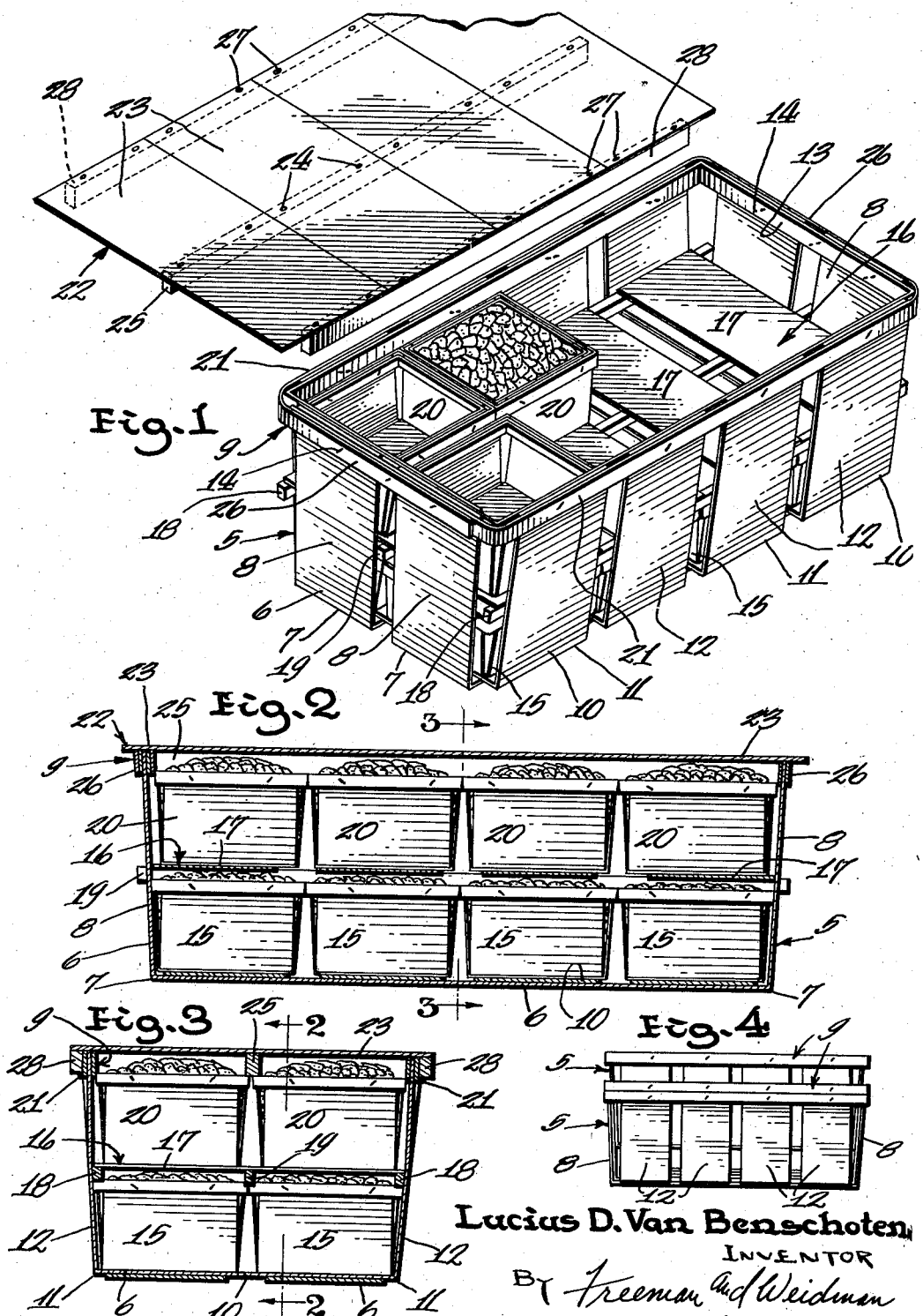

2,124,217

UNITED STATES PATENT OFFICE 2,124,217

PACKING RECEPTACLE FOR FILLED ARTICLE CONTAINERS

Lucius D. Van Benschoten, Berlin Heights, Ohio, assignor to The Berlin Fruit Box Company, Berlin Heights, Ohio, a corporation of Ohio Application June 23, 1934, Serial No. 732,101

13 Claims. (Cl. 217—42)

This invention relates to portable packing receptacles for filled article containers, and has for an object the provision of new and improved packing receptacles of this character.

In the drawing accompanying this specification and forming a part of this application, I have shown, for purposes of illustration, an embodiment which my invention may assume, and in this drawing:

Figure 1 is a perspective view of an embodiment of the invention, showing the cover of the container removed therefrom, Figure 2 is a longitudinal vertical sectional view through the container corresponding to the line 2—2 of Figure 3, Figure 3 is a transverse vertical sectional view corresponding to the line 3—3 of Figure 2, while Figure 4 is a side elevational view of a plurality of containers, showing the manner in which they may be nested for shipment or storage.

As shown in the drawing, the container is in the form of a receptacle 5, which may comprise a plurality of spaced, relatively broad, longitudinally extending strips 6 of thin wood, of any suitable kind, approximately three-sixteenths to one-eighth of an inch thick, and four inches wide, scored and bent as at 7 to provide inclined end portions 8, held at the top by an oblong frame 9. Wood strips 10 of similar width and thickness are laid flat in predetermined spaced relation upon the strips 6, and extend transversely thereof, and each of the strips 10 is scored and bent as at 11, to provide side portions 12, which extend at an obtuse angle of predetermined angularity with respect to the strips 10, and at their upper ends are fastened to the frame 9. The frame 9 comprises a narrow strip 12 of wood, extending along the outer top edge of the receptacle 5, and forming a laterally projecting abutment therealong, and a similar strip 13 which extends along the inner edge of the receptacle, the extremities of the end portions 8 of the strips 7, and the extremities of the side portions 12 of the strips 10, extending between the strips 12 and 13, and all being fastened by suitable staples 14, together providing a somewhat flexible rim for the receptacle 5 due to the flexibility of the material employed.

The receptacle 5 is preferably of such size as to snugly accommodate in its narrower bottom portion, eight standard strawberry boxes 15, arranged in pairs transversely of the receptacle, it being noted that the boxes 15 when disposed rim to rim, have their bottoms spaced apart a distance corresponding to the space between the strips 10, and the strips are of a width to correspond substantially to the width of the bottoms of the berry boxes 15, so that the latter are supported at their bottoms on flat supporting surfaces, while the rims of the boxes 15 combine to span the distance between the end walls 8, and the side walls 12, of the receptatcle, thus to prevent shifting about in the receptatcle 5.

Disposed to overlie the bottom tier of berry boxes 15 is a partition 16 comprising four spaced, transversely extending platforms 17, supported at their ends by longitudinal stringer members 18 and 19, the members 18 being adapted to rest upon the outer edges of the berry boxes 15, and the member 19 upon the inner edges of the adjacent berry boxes 15, and serving to space the platforms somewhat above, though closely adjacent to, the contents of the berry boxes 15, to prevent crushing and dislodgment of the berries, attention being called to the fact that the overall dimensions of the partition are such as to permit the same to fit snugly against the wall portions 8 and 12.

Upon the partition 16 another tier of eight boxes of berries, indicated at 20, is adapted to be placed, with each transverse pair of boxes, when the boxes are placed rim to rim, supported upon one of the platform members 17, but with the outer peripheral edges of the boxes slightly spaced from the side portions 21 of the frame 9, this spacing being due to two factors, first to the upward taper of the side walls 12, and secondly, to the tendency of the side portions 21 of the frame 9 to bulge slightly outward because of its somewhat flexible nature, providing a large mouth for the receptacle, and increasing the facility with which the berry boxes 20 may be placed in proper position.

Cooperable with the receptacle 5 is a combined clamping and closure device 22, which may comprise a plurality of thin boards 23 of suitable width to cover the top of the receptacle 5, and secured beneath the boards 23 by suitable fasteners 24, is a longitudinal member 25 of a length sufficient to span the distance between, and snugly fit within, the inner surfaces of the end portions 26 of the frame 9, and secured to the under surfaces of the opposite ends of the boards 23 by suitable fasteners 27, are combined securing and clamping members 28, each terminating slightly short of the end of the closure as shown, and the inner surfaces of which are spaced apart a somewhat less distance than the normal distance between side portions 21 of the frame 9, so that when the closure 22 is applied to the receptacle 5, and the clamping members 28 slipped over the outer surfaces of the side portions 21 of the frame 9, these side portions are somewhat bowed inwardly, a sufficient distance to press the berry boxes 20 toward each other to prevent shifting about within the receptacle, the member 25 resting upon the tops of the inner adjacent side walls of the berry boxes 20, which are disposed slightly below the level of the edge of the receptacle, and operating to space the closure from the tops of the boxes to afford room for the berries, yet to prevent the berries from falling out of the boxes when the receptacle is handled.

The tapered form of the receptacle 5 enables a plurality of empty receptacles to be nested in the manner illustrated in Figure 4, which is of immense importance in shipping and storing the empty receptacles, and additionally the tapered form of the receptacle, and the described construction of the cover, not only facilitate compact placement of the berry boxes within the receptacle 5, but enable the sides to be conveniently pinched in to prevent shifting about of the upper tier of boxes, while the lower tier is held against shifting by formation corresponding to the taper of the berry boxes themselves, and the berries are completely protected against crushing or spilling within the crate.

It will be understood by those skilled in the art that I have accomplished at least the principal object of my invention, and at the same time it will be obvious that the embodiment of my invention herein disclosed and described embodies advantages other than those particularly pointed out or suggested herein, and that it may be variously changed and modified without departing from the spirit of my invention or sacrificing the advantages thereof; accordingly it will be understood by those skilled in the art that the disclosure herein is illustrative only and that my invention is not limited thereto.

I claim:

1. A portable packing receptacle for filled article containers, comprising: a walled open-mouth receptacle formed to accommodate a plurality of filled open-mouthed article containers with their mouths substantially coinciding with the mouth of said receptacle; and closure means forming a common closure for said article containers and said receptacle, and having abutments spaced apart a less distance than the width of the mouth of said receptacle, and manipulable to engage the walls of said receptacle and to flex said walls, thus to snugly fix said containers against shifting in said receptacle.

2. A portable packing receptacle for filled berry boxes, comprising: an oblong walled open-mouth receptacle, formed to accommodate a plurality of filled open-mouthed berry containers, with the mouths of said containers disposed substantially to coincide with the open mouth of said receptacle; and closure means forming a common closure for said article containers and said receptacle, having a longitudinally extending bracing member extending between the end walls of said receptacle, and having abutments spaced apart a less distance than the width of the mouth of said receptacle, and operable to engage the side walls of said receptacle to flex said walls toward each other and toward said containers to snugly fix said containers against shifting in said receptacle.

3. A portable packing receptacle for filled article containers, comprising: an open-mouthed receptacle having upwardly diverging walls, and proportioned to accommodate a plurality of filled open-mouthed article containers; and closure means, having rigidly fixed abutments spaced apart a less distance than the normal span of said mouth, manipulable for simultaneously closing said receptacle, for holding said articles in said containers, and for flexing the tapered walls of said receptacle inwardly toward each other to snugly fix said containers against shifting in said receptacle.

4. A portable packing receptacle for filled article containers, comprising: a walled receptacle formed to accommodate upper and lower tiers of filled open-mouthed article containers; a partition arranged between said tiers and adapted to hold the articles in the containers of the lower tier; and closure means, having rigid abutments spaced apart a less distance than the normal span of the mouth of said receptacle, manipulable for simultaneously closing said receptacle, for holding said articles in the containers of the upper tier, and for flexing the walls of said receptacle substantially above said partition to snugly fix all of said containers against shifting in said receptacle, said partition providing a fulcrum about which said walls may be flexed.

5. A portable packing receptacle for filled article containers, comprising: a walled receptacle having upwardly diverging walls, said receptacle being proportional to accommodate upper and lower tiers of filled open-mouthed article containers; a partition arranged between said tiers and adapted to hold the articles in the containers of the lower tier; and closure means, having spaced abutments spaced apart a distance less than the normal span of the mouth of said receptacle, manipulable for simultaneously closing said receptacle, for holding said articles in the containers of said upper tier, and for flexing the tapered walls of said receptacle to snugly fix said containers against shifting in said receptacle.

6. A portable packing receptacle for filled berry containers, comprising: an open-mouth receptacle formed to accommodate upper and lower tiers of filled open-mouthed berry containers, said receptacle having spaced strips adjacent their ends bent to outwardly inclined positions to form upwardly diverging end walls; transversely extending strips spaced apart a distance to form a support to coincide with the bottom of a berry container of the lower tier when said containers are arranged rim to rim in said receptacle, said transverse strips adjacent their ends being bent to outwardly inclined position to form upwardly diverging side walls; an oblong frame secured to the free extremity of the inclined portions of said side and end walls, and projecting laterally outwardly therefrom, said receptacle being adapted to nest within a similar receptacle when empty, and said frame serving to suspend the bottom of said receptacle short of the bottom of said similar receptacle when nested therewith; a partition extending between said tiers of containers, engaging the containers of the lower tier, and holding the contents thereof in place, and forming a support for the upper tier of containers; and closure means for said receptacle, manipulable simultaneously for closing said receptacle and the mouths of the containers of the upper tier and having means for flexing the tapered walls of said receptacle to snugly fix said containers against shifting in said receptacle.

7. A generally rectangular packing receptacle adapted to contain a plurality of generally rectangular smaller fruit containers, each of said containers having ventilating spaces, said receptacle having a first set of generally parallel continuous strips forming two sides of said receptacle and partially forming the bottom of said receptacle; and a second set of generally parallel continuous strips, continuously exteriorly overlapping said first set of strips substantially at right angles, only along the bottom of said receptacle, and cooperating with said first set of strips to complete the bottom of said receptacle and to provide the remaining sides of said receptacle, said first and second sets of strips being spaced apart to provide ventilating spaces at the bottom and sides of said receptacle communicable with air exterior of the area occupied by the bottom of the receptacle and with the ventilating spaces of said containers when the latter are packed within said receptacle; and a frame to which the free edges of the side portions of said strips are secured.

8. A generally rectangular packing receptacle adapted to contain a plurality of generally rectangular smaller fruit containers, each of said containers having ventilating spaces, said receptacle having a first set of generally parallel strips forming two sides of said receptacle and partially forming that part of the bottom portion of said receptacle upon which said receptacle is adapted to rest, and a second set of generally parallel strips, crossing said first set of strips substantially at right angles at the inner side of said receptacle, adapted to rest on said first set of strips in elevated position with reference to the contacting portions of said first set of strips and with reference to the surface upon which said receptacle may be placed, to provide for free circulation of air beneath the bottom of said receptacle, and cooperating with said first set of strips to complete the bottom of said receptacle, and to provide the remaining sides of said receptacle; said first and second sets of strips being spaced apart to provide ventilating spaces at the bottom and sides of said receptacle communicable with air exterior of the area occupied by the bottom of the receptacle and with the ventilating spaces of said containers when packed within said receptacle; and a frame to which the free edges of the side portions of said strips are secured.

9. A generally rectangular packing receptacle adapted to contain a plurality of generally rectangular inverted frusto-pyramidal smaller fruit containers, adapted to be disposed edge to edge in said receptacle, each of said containers having ventilating spaces, said receptacle having a first set of generally parallel strips forming two sides of said receptacle and partially forming the bottom of said receptacle, and a second set of generally parallel strips, crossing said first set of strips substantially at right angles, and cooperating with said first set of strips to complete the bottom of said receptacle and to provide the remaining sides of said receptacle, said first and second sets of strips being of a width substantially the same as the width of the bottom of each container, and being spaced apart a distance corresponding substantially to the distance between the bottoms of said containers when disposed edge to edge, to provide ventilating spaces at the bottom and sides of said receptacle communicable with the spaces between the containers and with the ventilating spaces of said containers when packed within said receptacle; and a frame to which the free edges of the side portions of said strips are secured.

10. A generally rectangular packing receptacle adapted to contain a plurality of generally rectangular smaller fruit containers, each of said containers having ventilating spaces, said receptacle having a first set of generally parallel strips of bendable material bent to form two sides of said receptacle and each having an integral portion partially forming the bottom of said receptacle, and a second set of generally parallel strips of bendable material, crossing said first set of strips substantially at right angles, and cooperating with said first set of strips to complete the bottom of said receptacle and bent to provide integrally formed remaining sides of said receptacle, said first and second sets of strips being spaced apart to provide ventilating spaces at the bottom and sides of said receptacle communicable with the ventilating spaces of said containers when packed within said receptacle; a frame to which the free edges of the side portions of said strips are secured; and closure means having rigidly fixed abutments, spaced apart a less distance than the normal span of the mouth of said receptacle, applicable to said receptacle when the mouth thereof is contracted, and resiliently frictionally engageable by defining walls of said mouth for securing said closure member in position.

11. A packing receptacle adapted to contain a plurality of smaller containers, each of said containers having ventilating spaces, said receptacle having vertically extending walls formed of strips spaced apart to provide ventilating openings communicable with the ventilating spaces of said containers, and having a bottom formed of a set of spaced generally parallel strips extending from wall to wall of said receptacle and adapted to support said containers, and a second set of spaced generally parallel strips upon which said first set of strips rests, said second set of strips extending generally at right angles to said first set of trips and from wall to wall of said receptacle, said second set of strips defining between each pair of adjacent strips ventilating spaces open at their ends, extending continuously along the bottom of said receptacle, communicable for their entire lengths with air exterior of the area occupied by the bottom of said receptacle, and communicating with the spaces between said first set of strips, and hence with the ventilating spaces of said containers.

12. A packing receptacle adapted to contain a plurality of smaller containers, each of said containers having ventilating spaces, said receptacle having vertically extending walls formed of strips spaced apart to provide ventilating openings communicable with the ventilating spaces of said containers, and having a bottom formed of a set of spaced generally parallel strips extending from wall to wall of said receptacle and adapted to support said containers, and a second set of spaced generally parallel strips upon which said first set of strips rests, said second set of strips extending generally at right angles to said first set of strips and from wall to wall of said receptacle, said second set of strips defining between adjacent strips ventilating spaces open at their ends extending continuously along the bottom of said receptacle, and communicating with air exterior of the area occupied by the bottom of said receptacle and with the spaces between said first set of strips, and hence with the ventilating spaces of said containers, the strips forming said vertically extending walls comprising integral extensions of the strips forming the bottom of said receptacle.

13. A flexible generally rectangular packing receptacle adapted to contain a plurality of generally rectangular smaller containers, each of said containers having ventilating spaces, said receptacle having a first set of generally parallel continuous strips forming two sides of said receptacle and partially forming a bottom of said receptacle, said strips adjacent the junction of the bottom and sides being sharply bent to define angular corners, and a second set of generally parallel strips, crossing said first set of strips substantially at right angles only along the bottom of said receptacle, and cooperating with said first set of strips to complete the bottom of said receptacle and to provide the remaining sides of said receptacle, said second set of strips being sharply bent adjacent the junction of the bottom and sides to define angular corners, the various adjacent strips of said first and second sets of strips being spaced apart to provide ventilating spaces at the bottom and sides of said receptacle communicable with air exterior of the area occupied by the bottom of said receptacle and with the ventilating spaces of said containers when the latter are packed in said receptacle; and a frame to which the free edges of the side portions of said strips are secured.

LUCIUS D. VAN BENSCHOTEN.